(12) United States Patent
Guttilla et al.

(10) Patent No.: US 8,025,301 B2
(45) Date of Patent: Sep. 27, 2011

(54) STRUCTURAL I-BEAM AUTOMOTIVE SUSPENSION ARM

(75) Inventors: Michael Guttilla, Bloomfield Village, MI (US); Chris Broughton, Mount Albert (CA); Thomas Alexander Sparrow, Toronto (CA)

(73) Assignee: Multimatic Inc., Markham, Ontario (CA)

( * ) Notice: Subject to any disclaimer, the term of this patent is extended or adjusted under 35 U.S.C. 154(b) by 0 days.

(21) Appl. No.: 12/740,811

(22) PCT Filed: Nov. 24, 2008

(86) PCT No.: PCT/CA2008/002065
§ 371 (c)(1),
(2), (4) Date: Apr. 30, 2010

(87) PCT Pub. No.: WO2009/065228
PCT Pub. Date: May 28, 2009

(65) Prior Publication Data
US 2010/0264615 A1  Oct. 21, 2010

(30) Foreign Application Priority Data
Nov. 20, 2007  (CA) ..................................... 2611281

(51) Int. Cl.
*B60G 3/04* (2006.01)
(52) U.S. Cl. ............................................... 280/124.134
(58) Field of Classification Search ........... 280/124.134, 280/124.135, 124.136, 124.14, 124.143; 29/897.2
See application file for complete search history.

(56) References Cited

U.S. PATENT DOCUMENTS

| 1,380,659 | A | | 6/1921 | Layman |
| 5,662,348 | A | | 9/1997 | Kusama et al. |
| 5,992,867 | A | * | 11/1999 | Kato et al. ............. 280/124.134 |
| 7,575,244 | B2 | * | 8/2009 | Howell et al. .......... 280/124.134 |
| 2005/0104315 | A1 | | 5/2005 | Howell et al. |

OTHER PUBLICATIONS

"PCT International Search Report dated Feb. 19, 2009 for PCT/CA2008/002065, from which the instant application is based," 2 pgs.

* cited by examiner

*Primary Examiner* — Faye M. Fleming
(74) *Attorney, Agent, or Firm* — Fredrickson & Byron, P.A.

(57) ABSTRACT

A structural element comprising a vehicle suspension control arm is constructed from a complex, single piece, sheet metal stamped component formed from a material of uniform thickness. The stamping is configured with the correct plan view shape and formed into an I-beam cross-section comprising a central web portion and two flange portions. The central web portion is configured as a single material thickness and the flange portions comprise upstanding and downstanding closed sections with a continuous double returned segment. The open ends of the sheet metal terminate at or near the central web portion and are welded to the web portion, and in an alternative embodiment also to the continuous double returned segment, to create a favorable structural I-beam section with flange portions twice the thickness of the web portion.

16 Claims, 8 Drawing Sheets

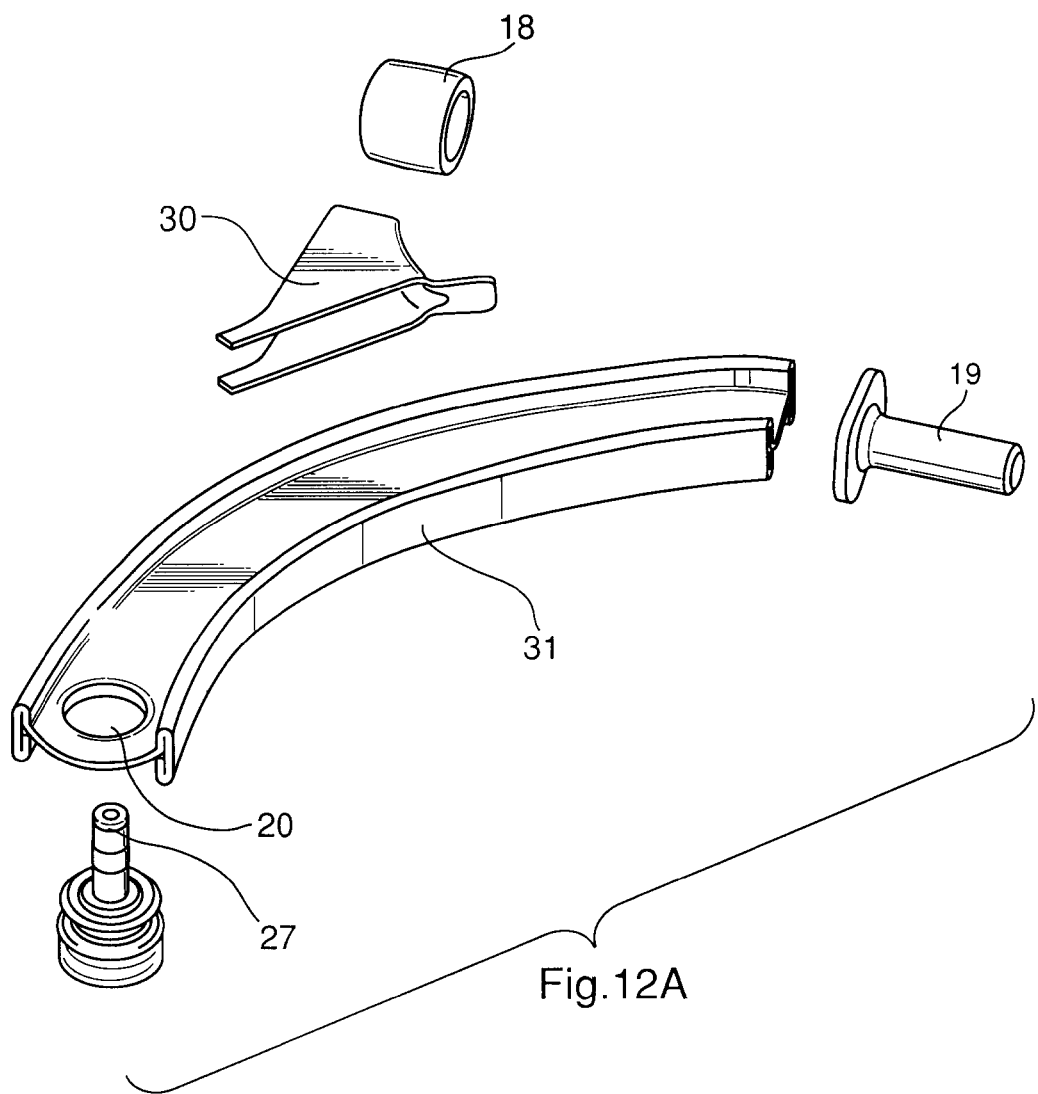

US 8,025,301 B2

STRUCTURAL I-BEAM AUTOMOTIVE SUSPENSION ARM

RELATED APPLICATIONS

This application is a 35 U.S.C. 371 national stage filing from International Application No. PCT/CA2008/002065 filed Nov. 24, 2008, which claims priority to Canadian Patent Application No. 2,611,281, filed Nov. 20, 2007, the teachings of which are incorporated herein by reference.

FIELD OF THE INVENTION

This invention applies to a manufacturing process for structural elements formed from sheet metal, more particularly to those components requiring high stiffness to weight and strength to weight ratios. In particular, the invention applies to an automotive suspension arm.

DESCRIPTION OF THE PRIOR ART

Most modern road vehicles utilize some form of suspension system to isolate the passenger compartment from wheel disturbances caused by irregularities in the road surface. These suspension systems normally include some form of energy storage medium such as a spring, a device to control the spring's motion such as a damper, and a linkage arrangement to control the kinematics of the wheel movement. This combination of components is configured to allow the vehicle's wheels to move up and over road irregularities in a controlled manner. The most common form of linkage arrangement is a four-bar linkage configuration, constructed from the spindle assembly, the vehicle body, and two pivoting structural elements commonly referred to as control arms.

FIG. 1 illustrates a common prior art four-bar link configuration. The control arms (1)(2) locate and guide the movement of the spindle assembly (3), relative to the vehicle body (4). The spindle assembly carries the wheel, tire, bearing assembly and brake assembly which are collectively referred to as the unsprung mass (5) of the vehicle. The unsprung mass also includes a portion of the control arm weight. Because there is significant energy involved in moving the unsprung mass over road surface disturbances, it is preferable to reduce the combined weight of this subassembly as much as possible. Additionally, because the handling characteristics of the vehicle are directly dependent on the controlled movement of the unsprung components, it is imperative that the control arms have sufficient stiffness and strength to resist the substantial loadings that are imparted upon them.

It is therefore important that suspension control arms be strong and stiff to function well when loaded, as well as light in weight to reduce the unsprung mass. Reducing weight normally results in a reduction of both strength and stiffness. Great ingenuity is required to design parts with reduced weight but equivalent performance characteristics. The operational loads imparted on suspension control arms are discrete and well understood so that non-uniform structures can be developed to provide selective stiffness and strength in the directions and locations required by the application. Vehicle suspension control arms are generally configured in either an "A" or an "L" shape in plan view, depending on the configuration of the body mount to spindle relationship. In either case, the dominant induced loads are in the plane of the "A" or "L" formation and therefore require high in-plane stiffness. The most effective shapes for resisting these induced loads require a high concentration of material to be located around the edges of the "A" or "L" formation to maximize the in-plane second moment of area values. FIG. 2 illustrates a common prior art "L" shaped suspension control arm (8) with a high concentration of material around the edges of the structure facilitated by a casting manufacturing process. This structure is consistent with common structural section practice where I-beams are considered the most effective method of carrying bending loads. An I-beam configuration concentrates material at the extremities of the section away from the centroid, or neutral, axis. FIG. 2A is a cross-sectional view of a typical prior art I-beam, namely the cast "L" shaped suspension control arm of FIG. 2. The opposing extremities of an I-beam are referred to as the flanges (6) while the single centre component is referred to as the web (7). It is beneficial to have flanges that are thicker than the web to fully realize the structural advantages of an I-beam.

The requirement for optimized control arm structures to be non-uniform in shape has driven the use of a number of complex manufacturing processes. The most common manufacturing methods associated with vehicle control arm construction are casting, forging and the welding of press-formed metal stampings into subassemblies. Because of the complex shapes involved it is very difficult to manufacture an optimized vehicle control arm from simple press formed metal stampings.

The majority of suspension control arms that utilize press formed metal stampings in their construction are configured as closed box sections. FIG. 3 illustrates the section of a typical suspension control arm constructed from two U-shaped press-formed metal stampings. This type of structural section is far less efficient in resisting in-plane bending loads than an I-beam and requires a significant overlap of material to facilitate the required weld fillet joint. This material overlap is ultimately structurally redundant and results in a heavier solution than alternative cast or forged configurations.

U.S. Pat. No. 5,662,348 issued to Kusama et al discloses a suspension arm manufactured exclusively from press-formed parts. Kusama claims a wide range of different sectional configurations all aimed at stiffening a vehicle suspension control arm in a manner that is compatible with the induced loads. However, Kusama does not teach a method for creating a true I-beam section using press-forming techniques.

The use of I-beam sections is known in suspension arm technology and normally involves manufacturing using casting or forging techniques as illustrated in FIGS. 2 and 2A. However, it has also been common practice to utilize two cup-shaped press formed stampings, arranged back-to-back and projection welded together to create an I-beam section with the required plan view shape. Although I-beam sections have been created by combining two relatively simple stampings in this way, the flanges have been half the thickness of the web, which has resulted in poor structural performance. FIG. 4 illustrates a cross-sectional view of a typical prior art I-beam suspension control arm constructed from two cup-shaped press-formed stampings. It is important to note that the prior art manufacturing process dictates that the flanges are of a single material thickness while the web is of double material thickness. This is not an optimal structural configuration.

U.S. Pat. No. 1,380,659 issued to Layman relates to links, levers and the like, and more particularly to such articles when formed from sheet metal. Layman makes no reference to automotive suspension control arms and explicitly states that the object of the invention is to cheapen the cost of producing links, levers or the like of the sort to which the invention relates. There is no indication of an understanding of the induced loads associated with an automotive suspension control arm and the illustrations relate to general links and levers. Layman illustrates a number of potential cross-sections that could be formed from sheet metal but only one could be interpreted to represent a true I-beam section. However this I-beam section is not shown in the context of an automotive suspension control arm and does not illustrate the number of required components, any joint or method of connecting the sheet metal together such as welding. From this perspective the I-beam section of Layman is not fully described as being able to be rendered to practice. Finally, the I-beam section of Layman illustrates that the flanges and the web are of equal material thickness. This is not an optimal structural configuration.

U.S. Patent Application No. US 2005/0104315A1 to Howell et al discloses a vehicle suspension arm of a true I-beam section constructed using press formed sheet metal components. Unlike Layman, Howell fully describes a methodology for joining the stamped metal components so as to create a realizable I-beam automotive control arm. However the I-beam section of Howell possesses the same limitation as Layman in that the flanges and the web are of equal material thickness. Additionally, Howell requires that two stamped components be joined together to create the true I-beam section.

SUMMARY OF THE INVENTION

Accordingly, it would be advantageous to create a suspension control arm that could provide high inherent stiffness and strength while maintaining relatively low mass using a low cost manufacturing technique such as sheet metal press-forming. It has been proven that for large volume applications such as those dictated by the automotive industry, sheet metal press-forming is the most cost-effective method of manufacturing structural components. Almost every vehicle currently produced utilizes a body structure and selected subframes constructed almost entirely from either aluminum or steel stampings manufactured using press-forming techniques. The aim of the present invention, therefore, is to utilize metal press-forming in the manufacture of a vehicle suspension control arm.

In an embodiment of the present invention, a structural element comprising a vehicle suspension control arm is constructed from a complex, single piece, sheet metal stamped component formed from a material of uniform thickness. The stamping is configured with the correct plan view shape, namely an "A", "L", or other appropriate shape for the application, and is formed into an I-beam cross section comprising a central web portion and two flange portions. The central web portion is configured as a single material thickness and the flange portions comprise upstanding and downstanding closed sections. The upstanding and downstanding closed sections are configured with a continuous double returned segment of the uniform thickness sheet metal so that the thickness of each flange portion is two times the thickness of the web portion. The open ends of the sheet metal are adapted to terminate against the central web portion and be welded to the web portion using MIG, TIG, ARC or Laser welding or similar means. The final assembly possesses a favorable structural I-beam section since the flange portions are two times the thickness of the web portion.

Accordingly, a structural element formed from sheet metal comprising a vehicle suspension arm includes: a sheet metal stamped component formed from material of uniform thickness comprising a central web portion and two flange portions at opposite sides of said central web portion; said central web portion configured as a single material thickness; said flange portions comprising upstanding and downstanding closed sections; said upstanding and downstanding closed sections configured with a continuous double returned segment of said sheet metal, whereby the thickness of each flange portion is two times the thickness of the central web portion; wherein the open ends of the sheet metal are adapted to terminate against the central web portion and be rigidly fixed so that the structural element is of an I-beam section whereby the thickness of each flange portion is double the thickness of the central web portion.

In further aspects of the present invention:
a) the sheet metal stamped component is press-formed from sheet aluminum, sheet steel or similar sheet metal materials of uniform thickness comprising a central web portion and two flange portions at opposite sides of said central web portion;
b) the central web portion is configured as a single material thickness and includes an extruded opening at a predetermined point adapted to create a suitable structure to accept a ball joint of a spindle assembly;
c) the flange portions include upstanding and downstanding closed sections;
d) the upstanding and downstanding closed sections are configured with a continuous double returned segment of the sheet metal, whereby the thickness of each flange portion is two times the thickness of the central web portion;
e) the trim ends of the sheet metal are adapted to terminate against the central web portion and be rigidly fixed to the central web portion via MIG, TIG, Arc or laser welding or similar means;
f) at least one discontinuity is introduced in the flange portions to create a suitable structure to accept vehicle body attachment details.

In a preferred embodiment of the present invention the required plan view shape, namely an "A", "L", or other appropriate shape for the application, is created by rigidly attaching a bushing support structure to a main arm component using MIG, TIG, ARC or Laser welding or similar means. The main arm component is constructed in an identical manner to the sheet metal stamped component previously described but is of a simpler plan view shape that is easier to manufacture than a fully bifurcated configuration. The bushing support structure is configured as simple metal stamping of either open or closed section and is adapted to accept a round bushing support. In this manner the highly complex plan view shapes that are often dictated by the vehicle's suspension geometry requirements can be accommodated with a sheet metal stamped component of relatively simple plan view shape while maintaining all the advantages of the superior I-beam section previously described.

BRIEF DESCRIPTION OF THE DRAWINGS

FIG. 12A is an exploded perspective view of the further alternative embodiment of the inventive suspension control arm of FIG. 12.

DETAILED DESCRIPTION OF THE INVENTION

Figure 1:
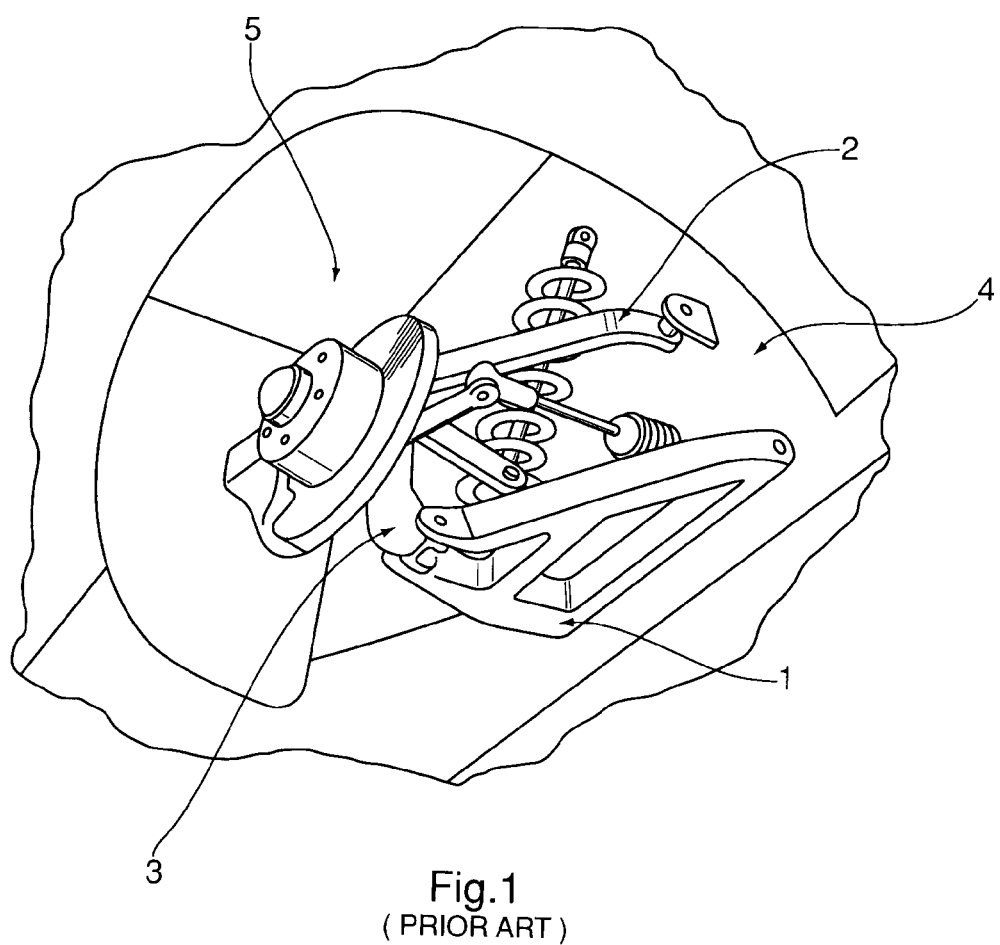
FIG. 1 is a perspective view of a common four bar link vehicle suspension system.
Figure 2:
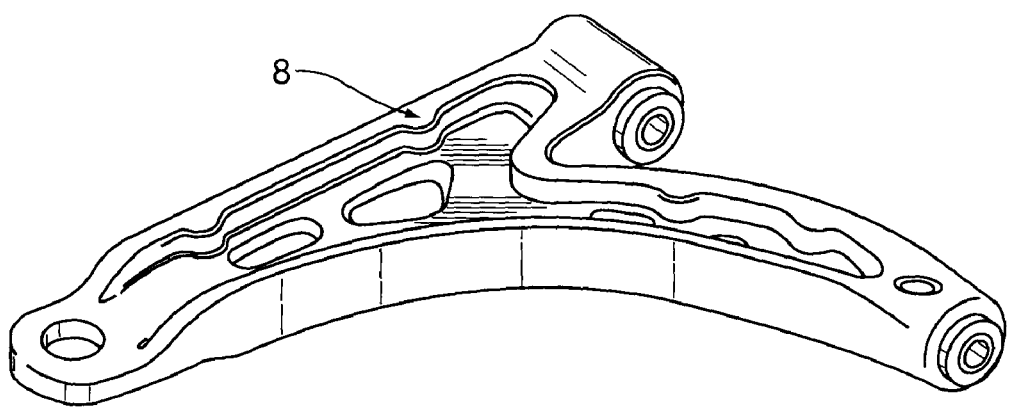
FIG. 2 is a perspective view of a typical cast prior art suspension control arm.
Figure 2A:
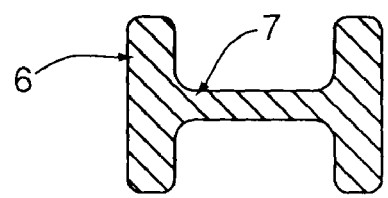
FIG. 2A is a sectional view of the typical prior art suspension control arm of FIG. 2.
Figure 3:
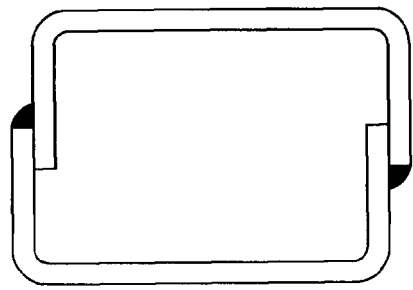
FIG. 3 is a sectional view of a typical stamped prior art suspension control arm.

Referring to FIGS. 5, 6, 7 and 8, a vehicular suspension control arm (10) is substantially constructed from a complex single piece, sheet metal stamped component (11), a round bushing support (18), an in-line pin bushing support (19) and a ball joint (27). The sheet metal stamped component (11) is manufactured by press-forming a uniform thickness, flat sheet of steel, aluminum or other suitable metal (e.g. titanium, tungsten, etc.) or alloy into a required plan view shape which is dictated by the vehicle's suspension geometry requirements. Additionally, the stamped component is configured, during the press-forming process, with a single material thickness web portion (12) and two flange portions (13) at opposite sides of the central web portion (12). Each flange portion (13) includes an upstanding closed section (14) and downstanding closed section (15) formed with a continuous contiguous returned segment (16) that is double returned onto one of the closed sections so that the trim end (17) terminates against the central web portion (12) which effectively doubles the section thickness in this area. These double material thickness flange portions (13) run around the entire periphery of the stamped component with the exception of localized areas requiring special formations to facilitate the vehicle body attachments, namely the round bushing support (18) and the in-line bushing support (19), and the ball joint (27).

Figure 4:
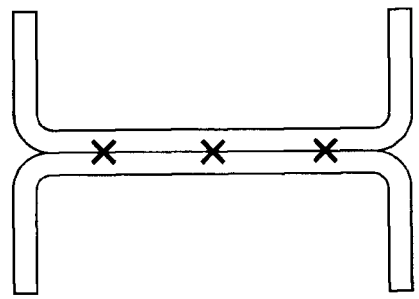
FIG. 4 is a sectional view of a typical stamped, I-beam section prior art suspension control arm.
Figure 9:
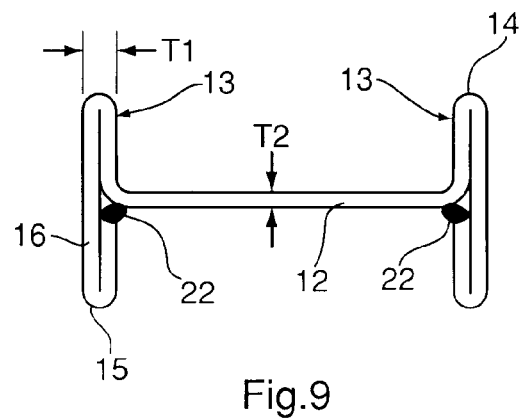
FIG. 9 is a typical sectional view of the preferred embodiment of the inventive suspension control arm of FIG. 8 including details of the welded joint.

The final suspension control arm structure (10) is completed by rigidly attaching the trim ends (17) of the double returned sheet metal section to the central web portion (12) using MIG (Metal Inert Gas), TIG (Tungsten Inert Gas), Arc or laser welding or similar means. A typical section that results from the described forming and attachment process is illustrated in the cross-sectional view of FIG. 9. A weld fillet (22) is configured to be either continuous or intermittent and is adapted to rigidly attach the trim ends (17) of the double returned sheet metal section to the central web portion (12). In this manner, a highly effective I-beam section is created with the flange portion (13) thickness (T1) being two times the central web portion (12) thickness (T2) and therefore structurally superior to the prior art section illustrated in FIG. 4.

Figure 10:
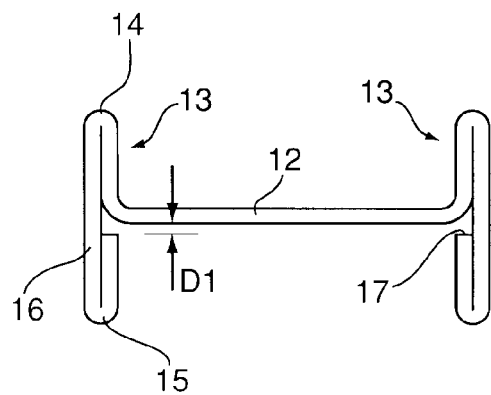
FIG. 10 is a sectional view of an alternative embodiment of the inventive suspension control arm.
Figure 11:
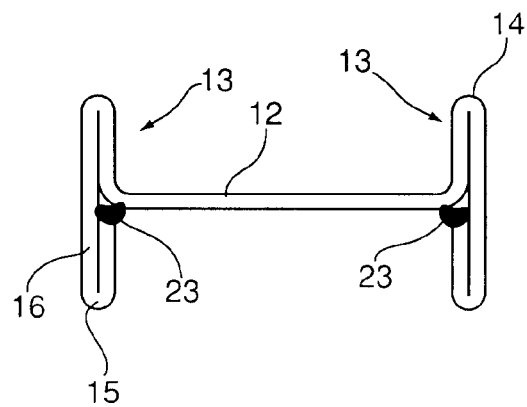
FIG. 11 is a sectional view of the alternative embodiment of the inventive suspension control arm of FIG. 10 including details of the welded joint.

FIGS. 10 and 11 illustrate an alternative embodiment of the present invention in which the trim ends (17) of the double returned sheet metal section terminate slightly away from the central web portion (12) creating a gap (D1). This gap (D1) is configured to facilitate a three material weld joint created by MIG or similar welding means. The resulting weld fillet (23) rigidly attaches the trim ends (17), central web portion (12) and continuous returned segment (16) of the flange portion (13) together in a single structural joint. In this manner the closed section of the flange portion (13) is very effectively connected to the central web portion (12).

Figure 5:
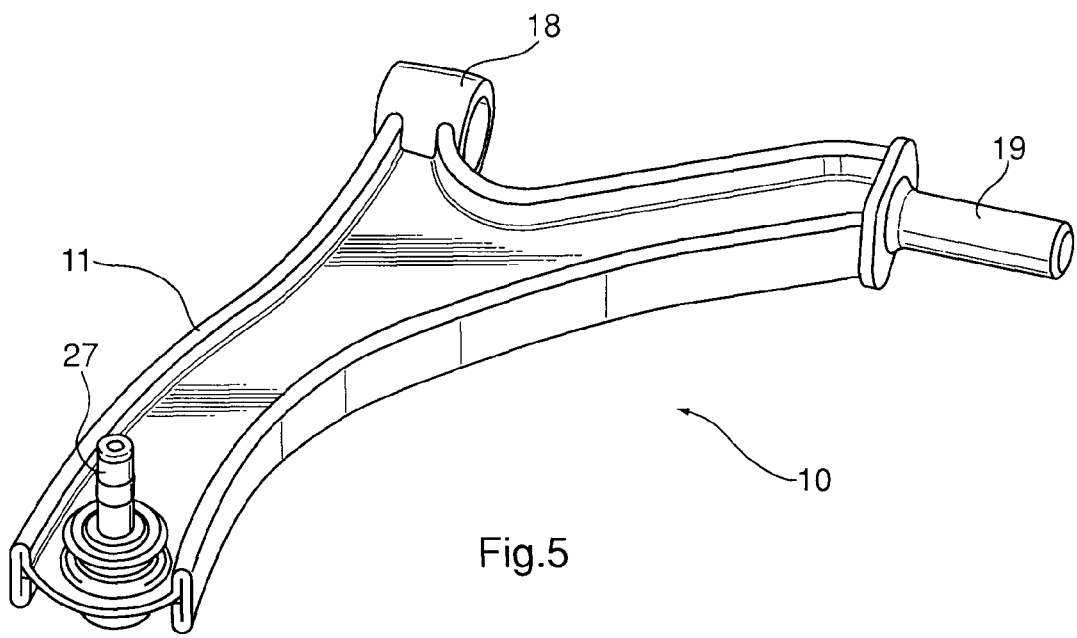
FIG. 5 is a perspective view of the inventive suspension control arm.
Figure 6:
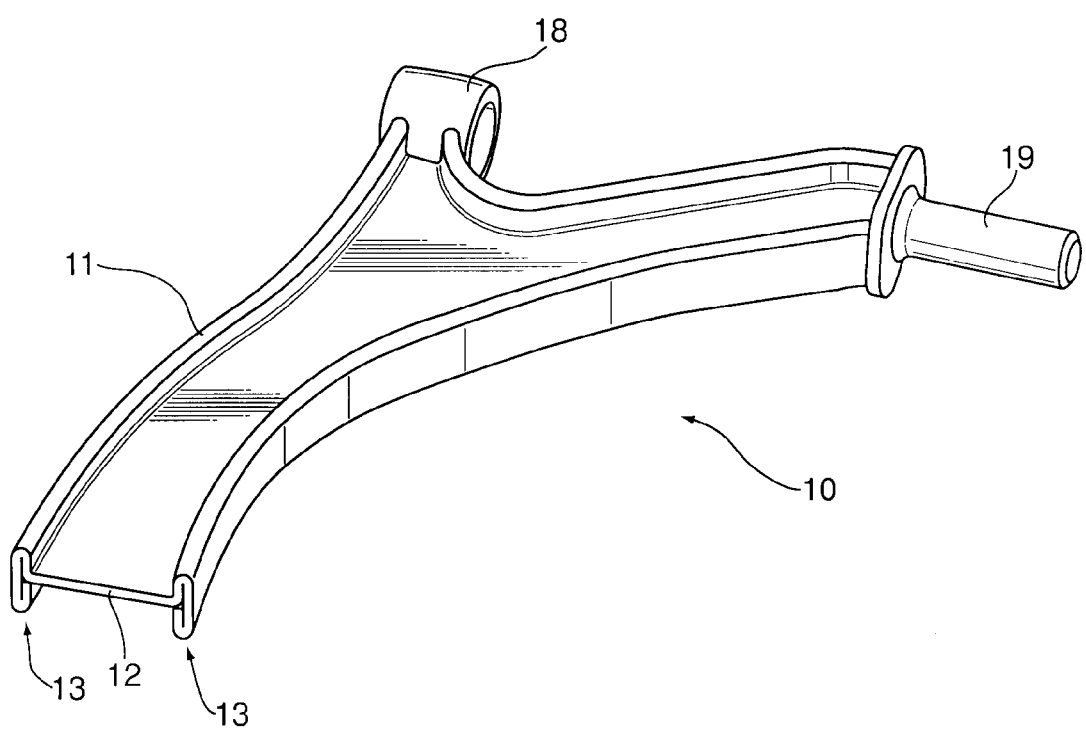
FIG. 6 is a sectional perspective view of the inventive suspension control arm.
Figure 7:
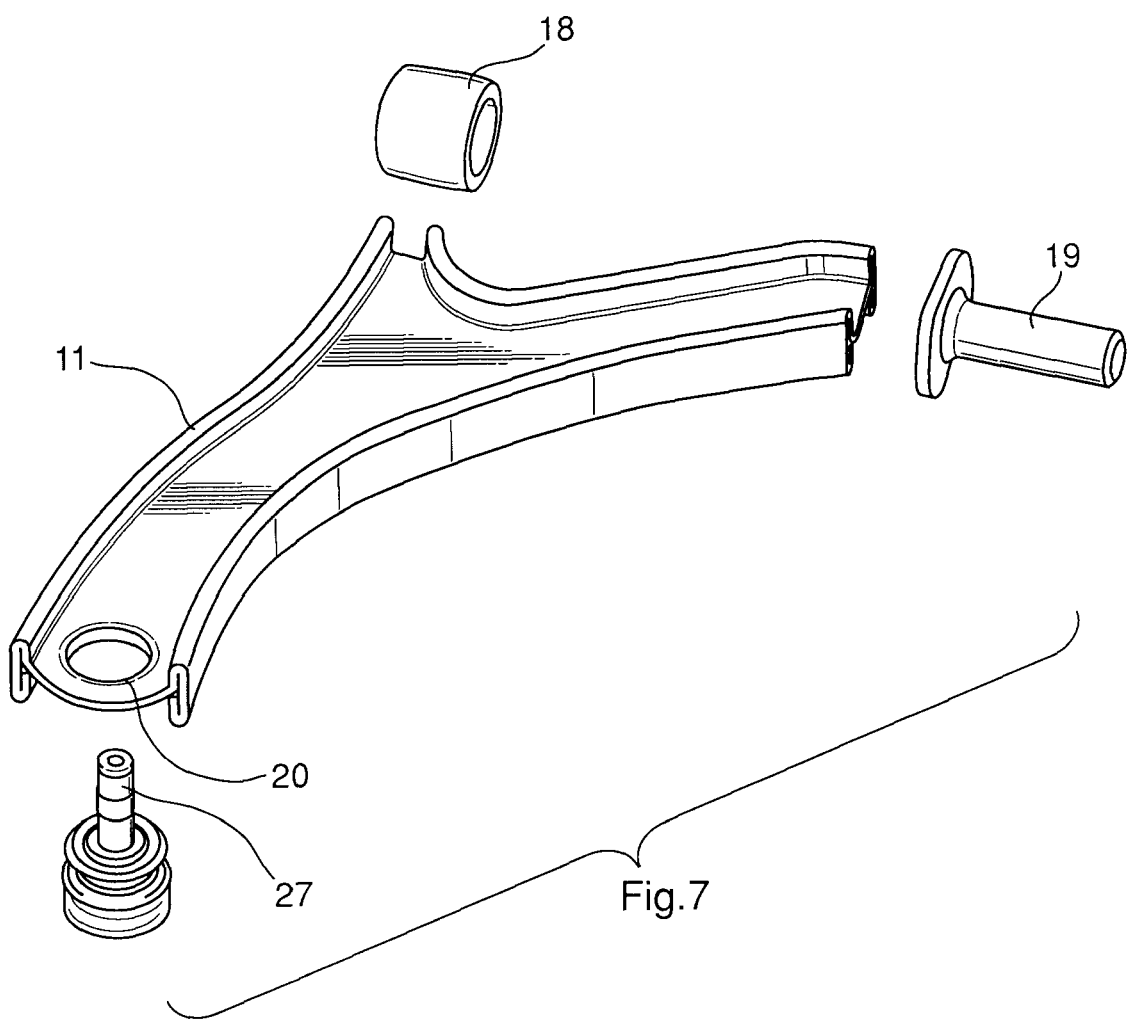
FIG. 7 is an exploded perspective view of the inventive suspension control arm.
Figure 8:
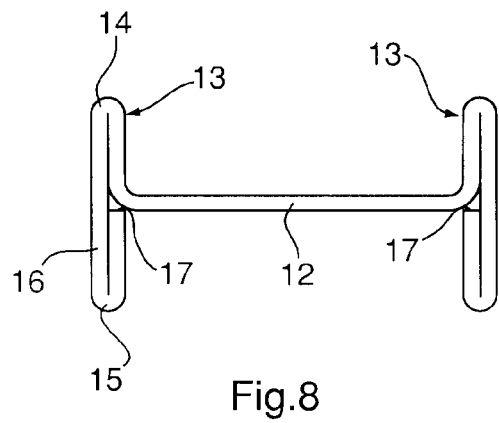
FIG. 8 is a typical sectional view of a preferred embodiment of the inventive suspension control arm.

Referring to FIGS. 5 and 7, the suspension control arm (10) is configured with an extruded opening (20) suitable for accepting the ball joint (27). This extruded opening (20) is created by punching a hole and press-forming an extrusion into said hole in the central web portion (12) of the sheet metal stamped component (11). The suspension control arm (10) is also configured with at least one discontinuity in the flange portions so that the vehicle body attachments (18)(19) can be facilitated. This discontinuity can be of complex shape adapted to accept a perpendicularly oriented, round bushing support (18) or a simple, straight cut-off adapted to accept an in-line pin (19).

Figure 12:
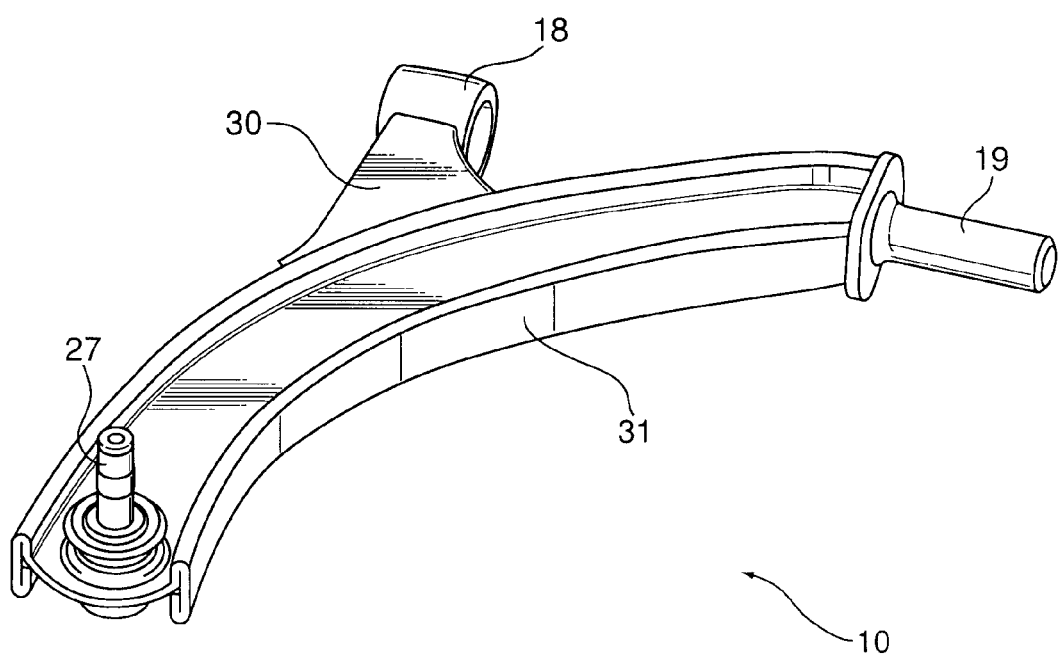
FIG. 12 is a perspective view of a further alternative embodiment of the inventive suspension control arm.

FIG. 12 illustrates an alternative preferred embodiment of the present invention in which the required plan view shape of the suspension control arm (10) is created by rigidly attaching a bushing support structure (30) to a main arm component (31) using MIG, TIG, Arc or laser welding or similar means. The main arm component (31) is constructed in an identical manner to the sheet metal stamped component (11) previously described. The bushing support structure (30) is configured as a simple metal stamping of either open or closed section and is adapted to accept a round bushing support (18). In this manner the highly complex plan view shapes that are often dictated by the vehicle's suspension geometry requirements can be accommodated with a main arm component (31) constructed in an identical manner to the sheet metal stamped component (11) previously described but of relatively simple plan view shape while maintaining all the advantages of the superior I-beam section previously described.

Although preferred embodiments of the invention have been illustrated, it will be apparent to the skilled workman that variations or modifications of the illustrated structure may be made without departing from the spirit or scope of the invention.

The invention claimed is:

1. A structural element formed from sheet metal comprising a vehicular suspension arm including:
 a) a sheet metal stamped component formed from material of uniform thickness comprising a central web portion and two flange portions at opposite sides of said central web portion;
 b) said central web portion configured as a single material thickness;
 c) said flange portions comprising upstanding and downstanding sections;
 d) said upstanding and downstanding sections each configured with a continuous contiguous double returned segment of said sheet metal, whereby the thickness of each flange portion is two times the thickness of the central web portion; wherein the trim ends of the sheet metal are adapted to terminate against the central web portion and be rigidly fixed so that the structural element is of an I-beam section whereby the thickness of each flange portion is double the thickness of the central web portion.

2. The structural element comprising a vehicular suspension arm of claim 1, wherein the sheet metal stamped component is press-formed from sheet aluminum, sheet steel or similar sheet metal materials.

3. The structural element comprising a vehicular suspension arm of claim 1, wherein the trim ends of the sheet metal stamped component terminate against the central web portion and are rigidly fixed to the central web portion via MIG, TIG, Arc or laser welding or similar means.

4. The structural element comprising a vehicular suspension arm of claim 1, wherein the trim ends of the sheet metal stamped component terminate at a small distance from the central web portion creating a gap, and the trim ends are rigidly fixed to both the central web portion and the continuous double returned segment via MIG, TIG, Arc or laser welding or similar means.

5. The structural element comprising a vehicular suspension arm of claim 1, wherein the sheet metal stamped component is configured with an extruded opening at a predetermined point in the central web portion to create a suitable structure to accept a ball joint of a spindle assembly.

6. The structural element comprising a vehicular suspension arm of claim 1, wherein at least one discontinuity is introduced in the flange portions to create a suitable structure to accept vehicle body attachment details.

7. A structural element formed from sheet metal comprising a vehicular suspension arm including:
   a) a sheet metal stamped component press-formed from sheet aluminum, sheet steel or similar sheet metal materials of uniform thickness comprising a central web portion and two flange portions at opposite sides of said central web portion;
   b) said central web portion configured as a single material thickness and including an extruded opening at a predetermined point adapted to create a suitable structure to accept a ball joint of a spindle assembly;
   c) said flange portions comprising upstanding and downstanding sections and including at least one discontinuity creating a suitable structure to accept vehicle body attachment details;
   d) said upstanding and downstanding sections each configured with a continuous contiguous double returned segment of said sheet metal, whereby the thickness of each flange portion is two times the thickness of the central web portion;
   wherein the trim ends of the sheet metal terminate against the central web portion and are rigidly fixed to the central web portion via MIG, TIG, Arc or laser welding or similar means, so that the structural element is of an I-beam section whereby the thickness of each flange portion is double the thickness of the central web portion.

8. A structural element formed from sheet metal comprising a vehicular suspension arm including:
   a) a sheet metal stamped component press-formed from sheet aluminum, sheet steel or similar sheet metal materials of uniform thickness comprising a central web portion and two flange portions at opposite sides of said central web portion;
   b) said central web portion configured as a single material thickness and including an extruded opening at a predetermined point adapted to create a suitable structure to accept a ball joint of a spindle assembly;
   c) said flange portions comprising upstanding and downstanding sections and including at least one discontinuity creating a suitable structure to accept vehicle body attachment details;
   d) said upstanding and downstanding sections each configured with a continuous contiguous double returned segment of said sheet metal, whereby the thickness of each flange portion is two times the thickness of the central web portion;
   wherein the trim ends of the sheet metal terminate a small distance from the central web portion creating a gap, and the trim ends are rigidly fixed to both the central web portion and the continuous double returned segment via MIG, TIG, Arc or laser welding or similar means, so that the structural element is of an I-beam section whereby the thickness of each flange portion is double the thickness of the central web portion.

9. The structural element comprising a vehicular suspension arm of claim 1, wherein a bushing support structure is configured to be rigidly attached to the sheet metal stamped component via MIG, TIG, Arc or laser welding or similar means and the bushing support structure is adapted to accept vehicle body attachment details.

10. The structural element comprising a vehicular suspension arm of claim 9, wherein the sheet metal stamped component and bushing support structure are press-formed from sheet aluminum, sheet steel or similar sheet metal materials.

11. The structural element comprising a vehicular suspension arm of claim 9, wherein the trim ends of the sheet metal stamped component terminate against the central web portion and are rigidly fixed to the central web portion via MIG, TIG, Arc or laser welding or similar means.

12. The structural element comprising a vehicular suspension arm of claim 9, wherein the trim ends of the sheet metal stamped component terminate a small distance from the central web portion creating a gap, and the trim ends are rigidly fixed to both the central web portion and the continuous double returned segment via MIG, TIG, Arc or laser welding or similar means.

13. The structural element comprising a vehicular suspension arm of claim 9, wherein the sheet metal stamped component is configured with an extruded opening at a predetermined point in the central web portion to create a suitable structure to accept a ball joint of a spindle assembly.

14. The structural element comprising a vehicular suspension arm of claim 9, wherein at least one discontinuity is introduced in the flange portions to create a suitable structure to accept additional vehicle body attachment details.

15. A structural element formed from sheet metal comprising a vehicular suspension arm including:
   a) a sheet metal stamped component press-formed from sheet aluminum, sheet steel or similar sheet metal materials of uniform thickness comprising a central web portion and two flange portions at opposite sides of said central web portion;
   b) a bushing support structure press-formed from a similar material to said sheet metal stamped component and configured to be rigidly attached to said sheet metal stamped component via MIG, TIG, Arc or laser welding or similar means;
   c) said bushing support structure configured as a simple open or closed section and adapted to accept vehicle body attachment details;
   d) said central web portion configured as a single material thickness and including an extruded opening at a predetermined point adapted to create a suitable structure to accept a ball joint of a spindle assembly;
   e) said flange portions comprising upstanding and downstanding sections and including at least one discontinuity creating a suitable structure to accept additional vehicle body attachment details;
   f) said upstanding and downstanding sections each configured with a continuous contiguous double returned segment of said sheet metal, whereby the thickness of each flange portion is two times the thickness of the central web portion;
   wherein the trim ends of the sheet metal terminate against the central web portion and are rigidly fixed to the central web portion via MIG, TIG, Arc or laser welding or similar means, so that the structural element is of an I-beam section whereby the thickness of each flange portion is double the thickness of the central web portion.

16. A structural element formed from sheet metal comprising a vehicular suspension arm including:
  a) a sheet metal stamped component press-formed from sheet aluminum, sheet steel or similar sheet metal materials of uniform thickness comprising a central web portion and two flange portions at opposite sides of said central web portion;
  b) a bushing support structure press-formed from a similar material to said sheet metal stamped component and configured to be rigidly attached to said sheet metal stamped component via MIG, TIG, Arc or laser welding or similar means;
  c) said bushing support structure configured as a simple open or closed section and adapted to accept vehicle body attachment details;
  d) said central web portion configured as a single material thickness and including an extruded opening at a predetermined point adapted to create a suitable structure to accept a ball joint of a spindle assembly;
  e) said flange portions comprising upstanding and downstanding sections and including at least one discontinuity creating a suitable structure to accept additional vehicle body attachment details;
  f) said upstanding and downstanding sections each configured with a continuous contiguous double returned segment of said sheet metal, whereby the thickness of each flange portion is two times the thickness of the central web portion;
  wherein the trim ends of the sheet metal terminate a small distance from the central web portion creating a gap, and the trim ends are rigidly fixed to both the central web portion and the continuous double returned segment via MIG, TIG, Arc or laser welding or similar means, so that the structural element is of an I-beam section whereby the thickness of each flange portion is double the thickness of the central web portion.

* * * * *